(12) United States Patent
Danckers et al.

(10) Patent No.: US 12,228,082 B2
(45) Date of Patent: Feb. 18, 2025

(54) SPLINED SHAFT ASSEMBLY WITH PILOTING FEATURES

(71) Applicant: Hamilton Sundstrand Corporation, Charlotte, NC (US)

(72) Inventors: Erika Danckers, Rockford, IL (US); Andrew P. Grosskopf, Rockford, IL (US); Ted A. Martin, Winnebago, IL (US); Douglas J. Turner, Rockford, IL (US); Aaron M. Finke, Janesville, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 346 days.

(21) Appl. No.: 17/824,156

(22) Filed: May 25, 2022

(65) Prior Publication Data
US 2023/0383696 A1    Nov. 30, 2023

(51) Int. Cl.
| F02C 7/32 | (2006.01) |
| F01D 5/02 | (2006.01) |
| F16D 1/10 | (2006.01) |

(52) U.S. Cl.
CPC ............... *F02C 7/32* (2013.01); *F01D 5/026* (2013.01); *F05D 2220/323* (2013.01);
(Continued)

(58) Field of Classification Search
CPC .... F02C 7/32; F02C 7/36; F02C 7/275; F01D 5/026; F05D 2220/323; F05D 2220/76;
(Continued)

(56) References Cited

U.S. PATENT DOCUMENTS

| 9,476,459 B2 | 10/2016 | Lemmers, Jr. |
| 2009/0028636 A1 | 1/2009 | Kirschey |

(Continued)

FOREIGN PATENT DOCUMENTS

| EP | 2505860 A2 | 10/2012 |
| FR | 2786828 A1 | 6/2000 |

OTHER PUBLICATIONS

Extended European Search Report issued in European Application No. 23175198.3 dated Nov. 2, 2023.

*Primary Examiner* — Steven M Sutherland
(74) *Attorney, Agent, or Firm* — CANTOR COLBURN LLP

(57) ABSTRACT

A shaft assembly having: a first shaft with an inner facing surface having: an inner facing spline extending between spline ends; an inner facing projection, adjacent to one of the spline ends, extending to an inner facing projection surface; and an inner facing projection seat, adjacent to another of the spline ends; and a second shaft having an outer facing surface having: an outer facing spline extending between spline ends; an outer facing projection, adjacent to one of the spline ends of the outer facing spline, extending to an outer projection surface; and an outer facing projection seat, adjacent to another of the ends of the outer facing spline; the first shaft at least partially surrounds the second shaft; the inner facing projection surface is disposed against the outer facing projection seat; and the outer facing projection surface disposed against the inner facing projection seat.

17 Claims, 3 Drawing Sheets

(52) U.S. Cl.
CPC .. *F05D 2220/76* (2013.01); *F05D 2260/4031* (2013.01); *F16D 2001/103* (2013.01); *F16D 2300/08* (2013.01)

(58) Field of Classification Search
CPC ....... F05D 2260/4031; F16D 2001/103; F16D 2300/08
See application file for complete search history.

(56) References Cited

U.S. PATENT DOCUMENTS

| | | |
|---|---|---|
| 2012/0263523 A1 | 10/2012 | Durling |
| 2015/0311770 A1* | 10/2015 | Goi .................... H02K 7/1823 290/46 |
| 2019/0218921 A1 | 7/2019 | Breen |
| 2020/0324884 A1 | 10/2020 | Wilcox et al. |

* cited by examiner

SPLINED SHAFT ASSEMBLY WITH PILOTING FEATURES

BACKGROUND

The embodiments herein relate to a shaft assembly and more specifically to a splined shaft assembly with piloting features for operationally coupling an accessory gearbox to a generator of a gas turbine engine.

Aircraft components such as accessory gearboxes and generators are operationally connected by shaft assemblies. Input seals and mating rings may be seated around the shaft assemblies to prevent flow through their interfaces. Misalignment between the shafts in the shaft assemblies may result in performance and wear issues between the input seals and mating rings.

BRIEF SUMMARY

Disclosed is a shaft assembly comprising: a first shaft having a radial inner facing surface, wherein the inner facing surface includes: a radial inner facing spline extending axially between first and second spline ends; a radial inner facing projection, axially adjacent to one of the first and second spline ends of the radial inner facing spline, that extends to a radial inner facing projection surface; and a radial inner facing projection seat, axially adjacent to another of the first and second spline ends of the radial inner facing spline; and a second shaft having a radial outer facing surface, wherein the outer facing surface includes: a radial outer facing spline extending axially between first and second spline ends; a radial outer facing projection, axially adjacent to one of the first and second spline ends of the radial outer facing spline, that extends to a radial outer projection surface; and a radial outer facing projection seat, axially adjacent to another of the first and second ends of the radial outer facing spline; wherein: the first shaft at least partially surrounds the second shaft so that the radial inner and outer facing splines mesh with each other; the radial inner facing projection surface is disposed against the radial outer facing projection seat; and the radial outer facing projection surface is disposed against the radial inner facing projection seat.

In addition to one or more of the above disclosed aspects of the shaft assembly, or as an alternate, the radial inner facing spline has an inner facing spline height, the radial outer facing spline has an outer facing spline height, and the inner and outer facing spline heights are equal to each other; and the radial inner facing projection has an inner projection height, the radial outer facing projection has an outer projection height, and the inner and outer projection heights are equal to each other and are the same as or greater than the inner and outer facing spline heights.

In addition to one or more of the above disclosed aspects of the shaft assembly, or as an alternate, the radial inner facing spline has a rotor shaft root diameter, measured at the inner facing spline, and the radial inner facing projection seat is level with the rotor shaft root diameter of the radial inner facing spline; and the radial outer facing spline has a coupling shaft root diameter, measured at the outer facing spline, and the radial outer facing projection seat is level with the coupling shaft root diameter of the radial outer facing spline.

Further disclosed is an aircraft assembly, comprising: a drive component; a driven component; and a shaft assembly, operationally coupled between the drive component and the driven component, the shaft assembly having: a first shaft having a radial inner facing surface, wherein the inner facing surface includes: a radial inner facing spline extending axially between first and second spline ends; a radial inner facing projection, axially adjacent to one of the first and second spline ends of the radial inner facing spline, that extends to a radial inner facing projection surface; and a radial inner facing projection seat, axially adjacent to another of the first and second spline ends of the radial inner facing spline; and a second shaft having a radial outer facing surface, wherein the outer facing surface includes: a radial outer facing spline extending axially between first and second spline ends; a radial outer facing projection, axially adjacent to one of the first and second spline ends of the radial outer facing spline, that extends to a radial outer projection surface; and a radial outer facing projection seat, axially adjacent to another of the first and second ends of the radial outer facing spline; wherein: the first shaft at least partially surrounds the second shaft so that the radial inner and outer facing splines mesh with each other; the radial inner facing projection surface is disposed against the radial outer facing projection seat; and the radial outer facing projection surface is disposed against the radial inner facing projection seat.

In addition to one or more of the above disclosed aspects of the aircraft assembly, or as an alternate, the radial inner facing spline has an inner facing spline height, the radial outer facing spline has an outer facing spline height, and the inner and outer facing spline heights are equal to each other; and the radial inner facing projection has an inner projection height, the radial outer facing projection has an outer projection height, and the inner and outer projection heights are equal to each other and are the same as or greater than the inner and outer facing spline heights.

In addition to one or more of the above disclosed aspects of the aircraft assembly, or as an alternate, the radial inner facing spline has a rotor shaft root diameter, measured at the inner facing spline, and the radial inner facing projection seat is level with the rotor shaft root diameter of the radial inner facing spline; and the radial outer facing spline has a coupling shaft root diameter, measured at the outer facing spline, and the radial outer facing projection seat is level with the coupling shaft root diameter of the radial outer facing spline.

In addition to one or more of the above disclosed aspects of the aircraft assembly, or as an alternate, the drive component is a gearbox and the driven component is a generator.

In addition to one or more of the above disclosed aspects of the aircraft assembly, or as an alternate, the drive component is an accessory gearbox.

In addition to one or more of the above disclosed aspects of the aircraft assembly, or as an alternate, the first shaft is a rotor shaft that is operationally coupled to the generator; and the second shaft is a coupling shaft.

In addition to one or more of the above disclosed aspects of the aircraft assembly, or as an alternate, the aircraft assembly includes: a stationary structure; and a bearing operationally coupled between the stationary structure and the rotor shaft.

In addition to one or more of the above disclosed aspects of the aircraft assembly, or as an alternate, the aircraft assembly includes: a mating ring assembly supported by the coupling shaft, wherein the mating ring assembly defines a mating ring axial end surface; and an input seal assembly supported by the stationary structure, wherein the input seal assembly defines a seal assembly axial end surface; wherein, the mating ring axial end surface and the seal assembly axial end surface are configured to face and engage each other.

In addition to one or more of the above disclosed aspects of the aircraft assembly, or as an alternate, the stationary structure is a generator housing.

In addition to one or more of the above disclosed aspects of the aircraft assembly, or as an alternate, the aircraft assembly includes a gearbox output shaft operationally coupled to the gearbox; and a generator input shaft operationally coupled to the gearbox output shaft and the coupling shaft.

Further disclosed is an aircraft comprising: a gas turbine engine; and an aircraft assembly having one or more of the above disclosed aspects, wherein the gearbox is driven by the gas turbine engine.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
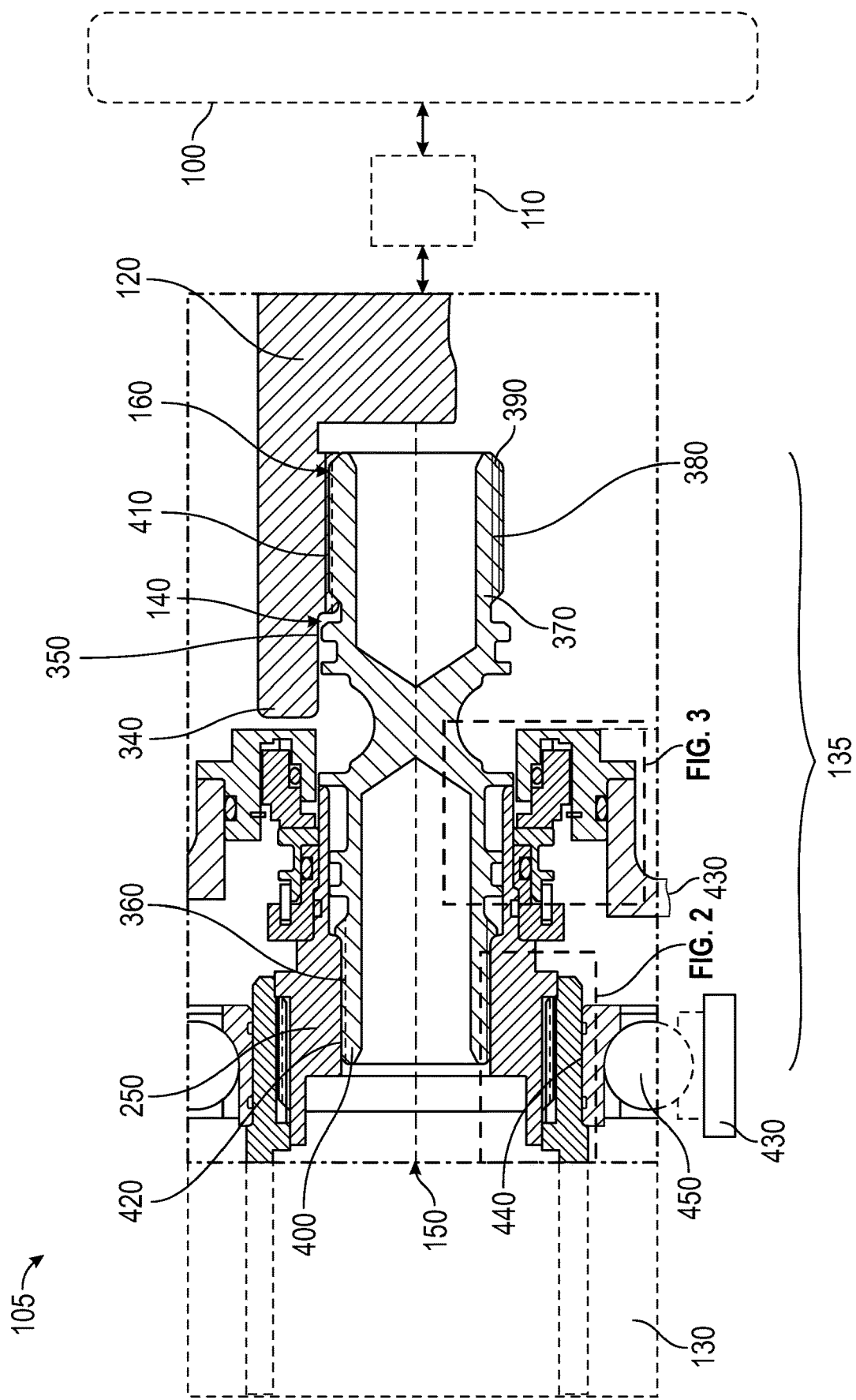
FIG. 1 shows an aircraft system, including an accessory gearbox, a generator and a splined shaft assembly that operationally couples the accessory gearbox and the generator according to an embodiment.

Turning to FIG. 1, an aircraft 100 may have a gas turbine engine 110. An aircraft assembly 105 may include a gear box. Gearboxes may be driven by the engine, motors, or the like. In one embodiment the gearbox may be an accessory gearbox 120 that may be driven by the gas turbine engine 110. A generator 130 of the aircraft assembly 105 may be driven by the accessory gearbox 120. That is, as between the accessory gearbox 120 and the generator 130, the accessory gearbox 120 is a drive component and the generator 130 is a driven component.

A shaft assembly 135, including a plurality of shafts 140, is operationally coupled between the accessory gearbox 120 and the generator 130 to enable the accessory gearbox 120 to drive the generator 130. The shafts 140 may be axially aligned with each other along a shaft centerline 150. Axially adjacent ones of the shafts 140 (e.g., those shafts 140 that are axially next to each other) may be coupled to each other via spline couplings 160, e.g., splines such as grooves or teeth on each of the shafts 140 that match up with each other to transmit torque.

Figure 2:
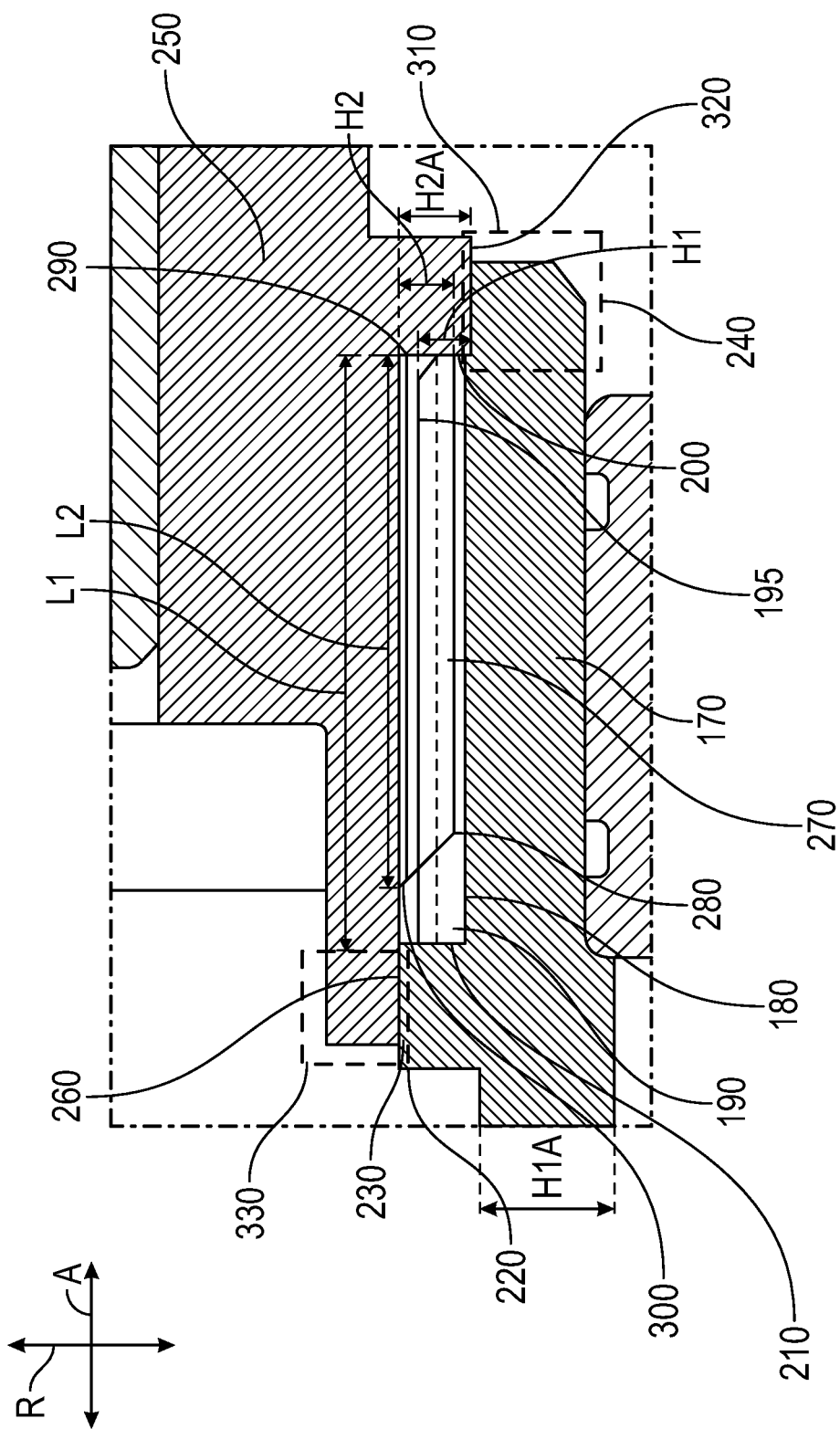
FIG. 2 shows details of piloting features formed adjacent to a spline coupling between a rotor shaft and a coupling shaft of the splined shaft assembly.

Turning to FIG. 2, a generator rotor shaft (or first shaft) 170 is operationally coupled to the generator 130 (FIG. 1). The rotor shaft 170 includes a radial inner surface 180 that includes a radial inner facing spline 190. The inner facing spline 190 extends in a radial direction R from the inner surface 180 to a radial spline tip 195 to define an inner facing spline height H1. The inner facing spline 190 extends in an axial direction A between a first spline end 200 and a second spline end 210 to define an inner facing spline length L1. A radial inner facing projection 220 is axially adjacent to one of the first and second ends 200, 210 of the inner facing spline 190. The inner facing projection 220 extends radially beyond the inner surface 180 to an inner projection surface 230 to define an inner projection height H1A that is at least as large as the inner facing spline height. A radial inner facing projection seat 240 is axially adjacent to another of the first and second ends 200, 210 of the inner facing spline 190. The inner facing projection seat 240 is formed at a rotor shaft root diameter of the inner facing spline 190, e.g., the rotor shaft root diameter being measured at the inner facing spline 190 and being level with the inner surface 180 at the inner facing spline 190.

A generator coupling shaft 250 (or second shaft) is operationally coupled to the rotor shaft 170. The coupling shaft 250 includes a radial outer facing surface 260 that includes a radial outer facing spline 270. The outer facing spline 270 extends radially outward from the outer facing surface 260 to a spline tip 280 to define an outer facing spline height H2. In one embodiment, the outer facing spline height H2A is the same as the inner facing spline height. The outer facing spline 270 extends axially between a first spline end 290 and a second spline end 300 to define an outer facing spline length L2. The outer facing spline length is between 75% and 125% of the inner facing spline length in one embodiment. A radial outer facing projection 310 is axially adjacent to one of the first and second ends 290, 300 of the outer facing spline 270. The outer projection 310 extends beyond the outer facing surface 260 of the coupling shaft 250 to a radial outer projection surface 320 to define an outer projection height that is the same as (e.g., equal to) the inner projection height. A radial outer facing projection seat 330 is axially adjacent to another of the first and second ends 290, 300 of the outer facing spline 270, formed at a coupling shaft root diameter of the inner facing spline 190, e.g., the coupling shaft root diameter being measured at the outer facing spline 270 and being level with the outer facing surface 260 of the outer facing spline 270.

In operation, the rotor shaft 170 at least partially surrounds the coupling shaft 250 so that the splines 190, 270 overlap. With this configuration, the splines 190, 270 mesh with each other to form a spline coupling. This causes the inner projection surface 230 to be disposed against the outer facing projection seat 330, and the outer projection surface 320 to be disposed against the inner facing projection seat 240. The projection surfaces 230, 320 and projection seats 240, 330 function as piloting features, also referred to as guiding features or motion limiting features, that may prevent misalignment between the splines 190, 270 as well as pitching motion between the shafts 140, 250.

Turning back to FIG. 1, a gearbox output shaft 340 is operationally coupled to the gearbox 120 and has a radially inner facing surface 350. The coupling shaft 250 has a radially inner facing surface 360. A generator input shaft 370 has a radial outer facing surface 380 and extends axially between a first end 390 at the gearbox output shaft 340 and a second end 400 at the coupling shaft 250. At the first end 390 of the input shaft 370, the outer facing surface 380 of the input shaft 370 meshes with the inner facing surface 350 of the output shaft 340 via a first-end spline coupling 410. At the second end 400 of the input shaft 370, the outer facing surface 380 of the input shaft 370 meshes with the inner surface 360 of the coupling shaft 250 via a second-end spline coupling 420. With this configuration, the gearbox 120 is configured to drive the generator 130.

The generator 130 may be housed within a generator housing 430, which is a stationary structure. A radial outer surface 440 of the rotor shaft 170 may be supported by the generator housing 430 via a bearing 450.

Figure 3:
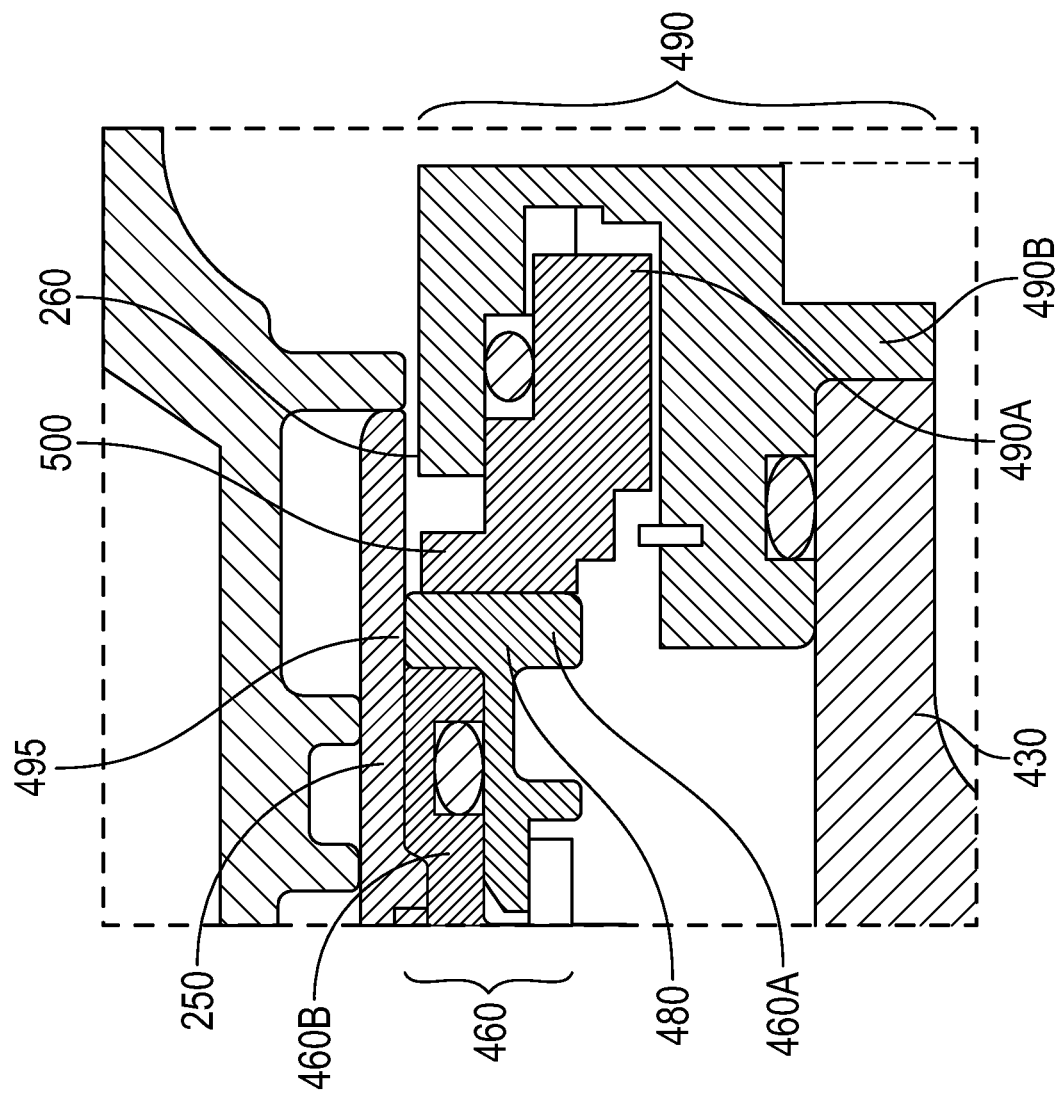
FIG. 3 shows details of a mating ring assembly and input seal assembly seated around the splined shaft assembly.

Turning to FIG. 3, a mating ring assembly 460, having a pair of mating rings 460A, 460B is supported against the outer facing surface 260 of the coupling shaft 250 at a location that is axially spaced apart from the rotor shaft 170. That is, the mating ring assembly 460 moves with movement of the coupling shaft 250. An axial end surface 480 of the mating ring assembly 460 faces away from the rotor shaft 170 and defines a mating ring sealing face. An input seal assembly 490, having input seal elements 490A, 490B is supported by the generator housing 430. That is, the input seal assembly 490 is stationary. An axil end surface 500 of the input seal assembly 490, which is a carbon nose, faces and is configured to engage the axial end surface 480 of the mating ring assembly 460 to provide a fluid seal interface. With this configuration, lubrication may be prevented from flowing axially in either direction past the input seal assembly 490.

Performance of the input seal assembly 490 is optimal when the axial end surfaces 480, 500 of the mating ring assembly 460 and input seal assembly 490 are both perpendicular to a shaft centerline 150, e.g., a center of rotation (FIG. 1). Performance degradation may occur due to misalignment between the generator 130 and the gearbox 120, which may lead to field performance issues. The projection surfaces 230, 320 and projection seats 240, 330 may ensure that the axial end surfaces 480, 500 of the mating ring assembly 460 and input seal assembly 490 are both perpendicular to the shaft centerline 150.

Thus, the disclosed embodiments provide a spline coupling between the rotor shaft 170 and input shaft 370 of the generator 130, on which the mating ring assembly 460 for the input seal assembly 490 is mounted. The piloting features on the spline coupling and the rotor shaft 170 ensure that the mating ring sealing face 495 is perpendicular to the shaft centerline 150. Without the piloting features, the input shaft 370 and spline coupling between the rotor shaft 170 and coupling shaft 250 would both accommodate misalignment between the generator 130 and the gearbox 120. With the pilot features, the coupling shaft 250 and mating ring assembly 460 are effectively isolated from any gearbox misalignment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A shaft assembly comprising:
a first shaft having a radial inner facing surface, wherein the radial inner facing surface includes:
a radial inner facing spline extending axially between first and second spline ends;
a radial inner facing projection, axially adjacent to one of the first and second spline ends of the radial inner facing spline, that extends to a radial inner facing projection surface; and
a radial inner facing projection seat, axially adjacent to another of the first and second spline ends of the radial inner facing spline; and
a second shaft having a radial outer facing surface, wherein the radial outer facing surface includes:
a radial outer facing spline extending axially between first and second spline ends;
a radial outer facing projection, axially adjacent to one of the first and second spline ends of the radial outer facing spline, that extends to a radial outer projection surface; and
a radial outer facing projection seat, axially adjacent to another of the first and second spline ends of the radial outer facing spline;
wherein:
the first shaft at least partially surrounds the second shaft so that the radial inner and outer facing splines mesh with each other;
the radial inner facing projection surface is disposed against the radial outer facing projection seat; and
the radial outer facing projection surface is disposed against the radial inner facing projection seat;
a mating ring assembly supported by the second shaft, wherein the mating ring assembly defines a mating ring axial end surface; and
an input seal assembly supported by a stationary structure that at least partially surrounds the shaft assembly, wherein the input seal assembly defines a seal assembly axial end surface;
wherein, the mating ring axial end surface and the seal assembly axial end surface are configured to face and engage each other.

2. The shaft assembly of claim 1, wherein:
the radial inner facing spline has an inner facing spline height, the radial outer facing spline has an outer facing spline height, and the inner and outer facing spline heights are equal to each other.

3. The aircraft assembly of claim 2, wherein:
the radial inner facing projection has an inner projection height, the radial outer facing projection has an outer projection height, and the inner and outer projection heights are equal to each other and are the same as or greater than the inner and outer facing spline heights.

4. The shaft assembly of claim 3, wherein:
the radial inner facing spline has a rotor shaft root diameter, measured at the radial inner facing spline, and the radial inner facing projection seat is level with the rotor shaft root diameter of the radial inner facing spline.

5. The aircraft assembly of claim 4, wherein:
the radial outer facing spline has a coupling shaft root diameter, measured at the outer facing spline, and the radial outer facing projection seat is level with the coupling shaft root diameter of the radial outer facing spline.

6. An aircraft assembly, comprising:
a drive component;
a driven component surrounded at least in part by a stationary structure; and
a shaft assembly, operationally coupled between the drive component and the driven component, the shaft assembly including:
a first shaft having a radial inner facing surface, wherein the radial inner facing surface includes:
a radial inner facing spline extending axially between first and second spline ends;
a radial inner facing projection, axially adjacent to one of the first and second spline ends of the radial inner facing spline, that extends to a radial inner facing projection surface; and
a radial inner facing projection seat, axially adjacent to another of the first and second spline ends of the radial inner facing spline; and
a second shaft having a radial outer facing surface, wherein the radial outer facing surface includes:
a radial outer facing spline extending axially between first and second spline ends;
a radial outer facing projection, axially adjacent to one of the first and second spline ends of the radial outer facing spline, that extends to a radial outer projection surface; and
a radial outer facing projection seat, axially adjacent to another of the first and second spline ends of the radial outer facing spline;
wherein:
the first shaft at least partially surrounds the second shaft so that the radial inner and outer facing splines mesh with each other;
the radial inner facing projection surface is disposed against the radial outer facing projection seat; and
the radial outer facing projection surface is disposed against the radial inner facing projection seat;
a mating ring assembly supported by the second shaft, wherein the mating ring assembly defines a mating ring axial end surface; and
an input seal assembly supported by the stationary structure,
wherein the input seal assembly defines a seal assembly axial end surface;
wherein, the mating ring axial end surface and the seal assembly axial end surface are configured to face and engage each other.

7. The aircraft assembly of claim 6, wherein:
the radial inner facing spline has an inner facing spline height, the radial outer facing spline has an outer facing spline height, and the inner and outer facing spline heights are equal to each other.

8. The aircraft assembly of claim 7, wherein:
the radial inner facing projection has an inner projection height, the radial outer facing projection has an outer projection height, and the inner and outer projection heights are equal to each other and are the same as or greater than the inner and outer facing spline heights.

9. The aircraft assembly of claim 8, wherein:
the radial inner facing spline has a rotor shaft root diameter, measured at the radial inner facing spline, and the radial inner facing projection seat is level with the rotor shaft root diameter of the radial inner facing spline.

10. The aircraft assembly of claim 9, wherein:
the radial outer facing spline has a coupling shaft root diameter, measured at the outer facing spline, and the radial outer facing projection seat is level with the coupling shaft root diameter of the radial outer facing spline.

11. The aircraft assembly of claim 10, wherein:
the drive component is a gearbox and the driven component is a generator.

12. The aircraft assembly of claim 11, wherein:
the drive component is an accessory gearbox.

13. The aircraft assembly of claim 12, wherein:
the first shaft is a rotor shaft that is operationally coupled to the generator; and
the second shaft is a coupling shaft.

14. The aircraft assembly of claim 13, further comprising:
a bearing operationally coupled between the stationary structure and the rotor shaft.

15. The aircraft assembly of claim 6, wherein
the stationary structure is a generator housing.

16. The aircraft assembly of claim 6, further comprising:
a gearbox output shaft operationally coupled to the gearbox; and
a generator input shaft operationally coupled to the gearbox output shaft and the coupling shaft.

17. An aircraft comprising:
a gas turbine engine; and
the aircraft assembly of claim 16, wherein the gearbox is driven by the gas turbine engine.

* * * * *